J. B. LOWRY.
Nut-Lock.

No. 204,587.  Patented June 4, 1878.

WITNESSES:
Jas. E. Hutchinson.
Henry C. Hazard.

INVENTOR.
Jno. B. Lowry, by
Prindle and Co. his Attys

UNITED STATES PATENT OFFICE.

JOHN B. LOWRY, OF SPRINGFIELD, ILLINOIS.

IMPROVEMENT IN NUT-LOCKS.

Specification forming part of Letters Patent No. 204,587, dated June 4, 1878; application filed March 21, 1878.

*To all whom it may concern:*

Be it known that I, JOHN B. LOWRY, of Springfield, in the county of Sangamon, and in the State of Illinois, have invented certain new and useful Improvements in Nut-Locks; and do hereby declare that the following is a full, clear, and exact description thereof, reference being had to the accompanying drawing, making a part of this specification, in which—

Figure 1:
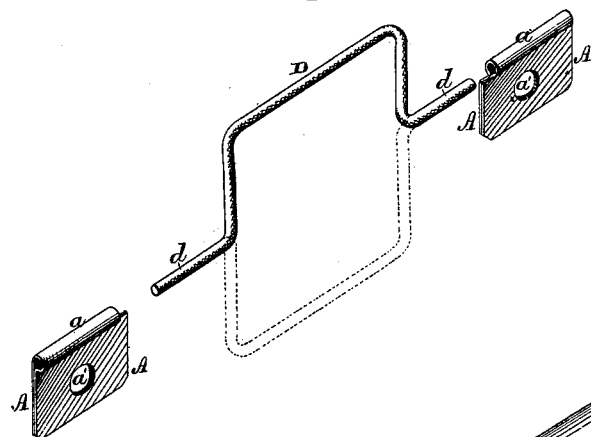
Figure 2:
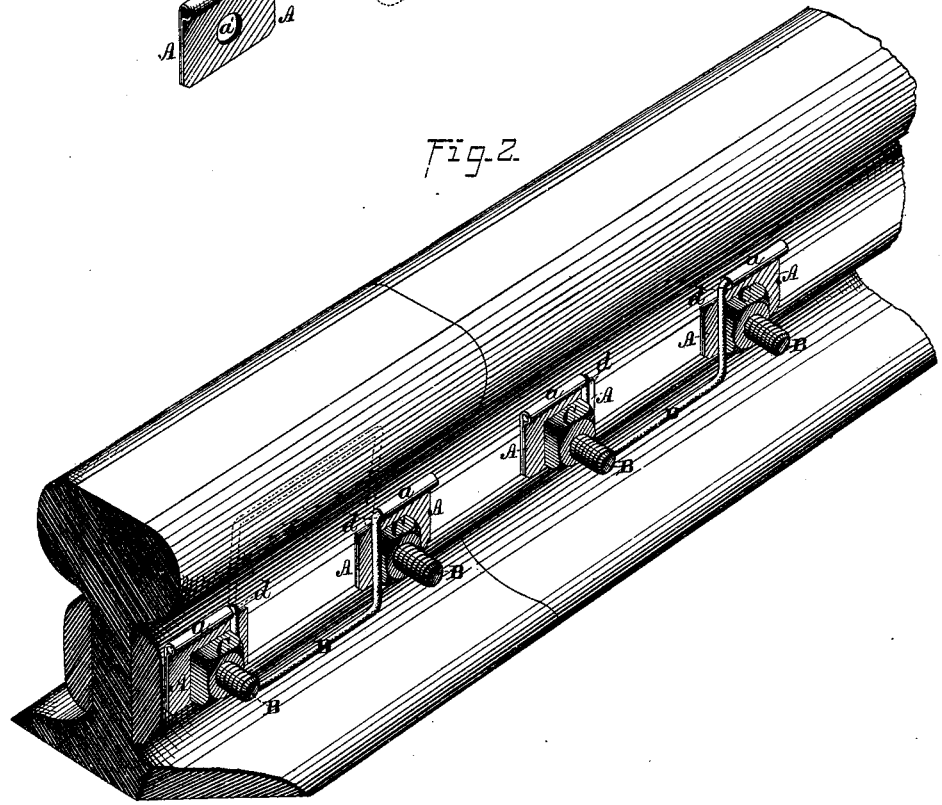

Figure 1 is a perspective view of my device with its several parts separated from each other, and Fig. 2 is a like view of the same as applied to the nuts of a rail-joint.

Letters of like name and kind refer to like parts in each of the figures.

The design of my invention is to enable the nuts of bolts to be locked in or released from position with ease and without injury to the locking devices; to which end it consists in the peculiar construction of the parts of the lock, and their combination with each other and with the bolts and nuts, substantially as and for the purpose hereinafter specified.

In the annexed drawing, A represents a sheet-metal washer, which has a rectangular form in plan view, and upon one edge has provided a sleeve, $a$, said sleeve being formed by folding backward the said edge, or by making said washer from a piece of metal which has twice its finished size, and folding the same so as to form said sleeve at the double or folded edge.

The washer A has a central opening, $a'$, which enables it to be passed over a bolt, B, after which the nut C of said bolt is placed upon the latter and screwed firmly down to place, care being taken to arrange said washer with its sleeve $a$ uppermost, and in a line with the sleeve $a$ of a second washer, A, which is placed beneath the nut C of an adjacent bolt.

Before being placed in position upon the bolts B, each washer A has loosely fitted into its sleeve $a$ a correspondingly-shaped arm, $d$, which forms one end of a crank-shaped wire or rod, D, the central crank portion of which rod has such length as to permit it, when turned downward, to just pass between the nuts C when the latter are arranged with their inner sides parallel. When the crank-rod D occupies the position shown by the full lines of Fig. 2 it bears against the contiguous sides of the nuts C and prevents the latter from turning; but when it is desired to turn said nuts, either for the purpose of tightening or removing the same, said crank-rod is turned upward to the position shown by the dotted lines of said figure.

In applying this invention, the bolts may vary in their relative positions, in which event it will only be necessary to employ a crank-rod, D, which corresponds in length to the distance between the nuts of said bolts, the washers A being equally applicable, whether said bolts are placed at a greater or a less distance from each other.

The device described furnishes an efficient and easily-applied means whereby nuts can be so firmly locked in place as to render impossible their being turned by jarring, while said nuts can be instantly and easily released when it becomes necessary to turn them, and as easily and quickly locked again after adjustment.

I am aware that it is not new to hinge a drop-bar to or upon a washer which embraces the ends of two bolts, said drop-bar being arranged to fall between and engage with the inner faces of the nuts placed upon said bolts, and do not claim such as my invention.

Having thus fully set forth the nature and merits of my invention, what I claim as new is—

As a means for locking the nuts C in place upon the bolts B, the washers A, provided with the openings $a'$ and sleeves $a$, and the crank-rod D, journaled within said sleeves, and capable of being turned downward between said nuts, substantially as specified.

In testimony that I claim the foregoing I have hereunto set my hand this 16th day of March, 1878.

JOHN B. LOWRY.

Witnesses:
JOSEPH WALLACE,
J. E. DUNN.